INVENTORS
CHARLES S. HYATT,
JOHN C. LOWMAN.
Toulmin & Toulmin
ATTORNEYS.

Patented Oct. 13, 1942

2,298,295

UNITED STATES PATENT OFFICE 2,298,295

COATED GLASS FABRIC

Charles S. Hyatt and John C. Lowman, Columbus, Ohio, assignors to Columbus Coated Fabrics Corporation, Columbus, Ohio, a corporation of Ohio Application April 8, 1938, Serial No. 200,958

1 Claim. (Cl. 117—126)

This invention relates to a composite plastic sheet product such as linoleum, shade cloth, decorative material, wall and floor coverings, and the like. These compositions are generally formed of coated fabric construction.

In particular this invention relates to coated glass woven fabrics and the method of making an improved product comprising woven felted or matted glass fibers interlocked and bonded together with suitable plastic coating compositions.

It is an object of this invention to produce highly flexible artificial fabrics comprising as a base interlaced glass fibers or equivalent prefused inorganic materials in the form of fibers interlocked together with a plastic coating composition, to provide a tough, flexible coated fabric material.

Another object of this invention is the production of a patterned decorative material in the form of sheets, slabs or other articles of any desired shape. The particular design or decorative surface is formed by coating a glass fabric base initially with a transparent or colored plastic composition and baking the coated fabric at approximately 200 degrees Fahrenheit until a tackfree, tough, flexible product is obtained. Other coating compositions may be applied thereover if desired or they may be omitted.

Another object of this invention is to produce a coated artificial fabric material formed from glass or mineral fibers of non-cellulosic base which is highly resistant to the action of acid or alkali, and at the same time being readily flexed, bent and capable of being embossed or printed upon if desired.

It is a further object of this invention to provide an economical coated fabric material comprising a glass fabric base having the openings between the fibers filled with synthetic resinous or cellulose coating compositions in a manner to produce a highly flexible coated fabric material. The improved product is highly resistant to wear, is strong and more resistant to deterioration in use than prior coated base fibers or threads comprising animal, cellulose or other organic material.

It is a further object to provide a fabric that is heat resistant and resistant to alkalis and acids which is particularly important in connection with domestic uses for oilcloth.

It is a further object to provide a composite product in which there is first applied an interlocking, anchoring coat of such plasticity and flexibility as to insure interlocking with the glass fabric despite the fact that there is no impregnation of the fibers of the fabric. After this interlocking coat has been provided, then the supplementary coats can be applied to the surface of the exposed portions of the interlocking coat so that they will be firmly anchored to the composite product.

This last advantage enables the production of a solid color coat which may be of the same color as the glass to give a uniform appearance of the back of the oilcloth or other fabric while the front may have a variety of different colored coats or designs. It will be understood that oilcloth or similar materials have a uniform color, in some instances, upon the back and various designs imprinted upon the front. By coloring the glass and using the interlocking coat of the same color, the back of the composite product will be of a uniform color which is highly desirable in the trade.

Another object of this invention is to increase the production rate of fabrics of this character that are coated. This increase in production rate and resultant lowering of the cost of manufacture is made possible by the use of higher temperatures in drying the coatings. The temperatures can be carried above that which is safe for use with textile materials. When glass fabrics are employed these higher baking temperatures are available. In this way the application and curing time can be speeded up considerably, effecting a substantial reduction in the production cost per yard of the finished product.

Referring to the drawing.

Figure 1:
Figure 1 is an enlarged diagrammatic cross sectional view showing the interwoven fabric base construction.
Figure 2:
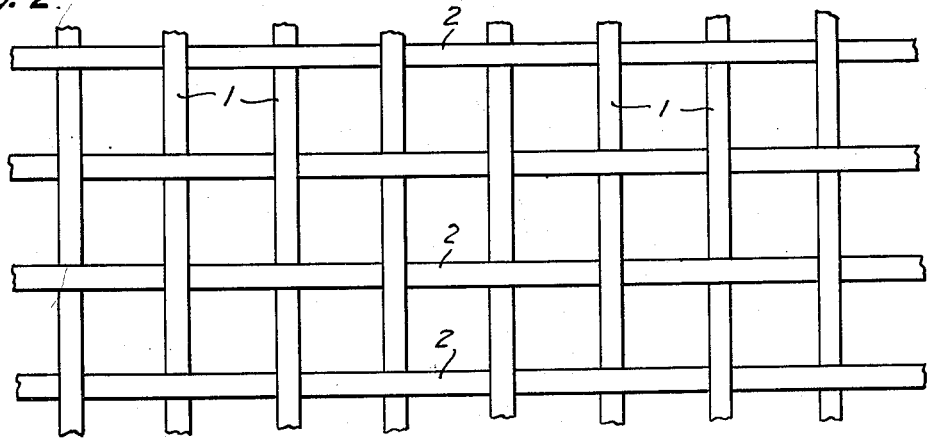
Figure 2 is an enlarged diagrammatic plan view of a loosely woven fabric construction as illustrated in Figure 1.

In detail, Figures 1 and 2 show interlaced glass fibers 1 and 2 woven in the form of a fabric. The threads or strands 1 and 2 are disposed lengthwise and vertical in a manner to interweave and interlock each other as illustrated in Figure 2.

Figure 3:
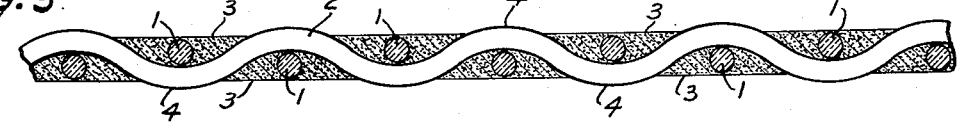
Figure 3 is a cross section of one form of the coated fabric product.

Figure 3 illustrates a glass fabric structure having applied thereto a plastic adhesive coating composition which securely bonds the interlaced fibers together. This initial plastic coating functions not only to mechanically bind the glass fibers together, but provides a foundation or base upon which other plastic coatings may be adhesively united thereto by application and drying. The plastic coating compositions applied to the base coat may be transparent or of any desired color or surface design. In the illustration shown the initial plastic coating 3 is thin, that is low enough in viscosity so that it will penetrate into the interstices between the fibers. The coating will tend to flow away from the crests 4 of the fibers and form a thin interlocking film across and between the fibers. This produces a highly resilient anchor coating upon which succeeding coatings may be applied to produce a built up coated fabric of any desired thickness and color.

Figure 4:
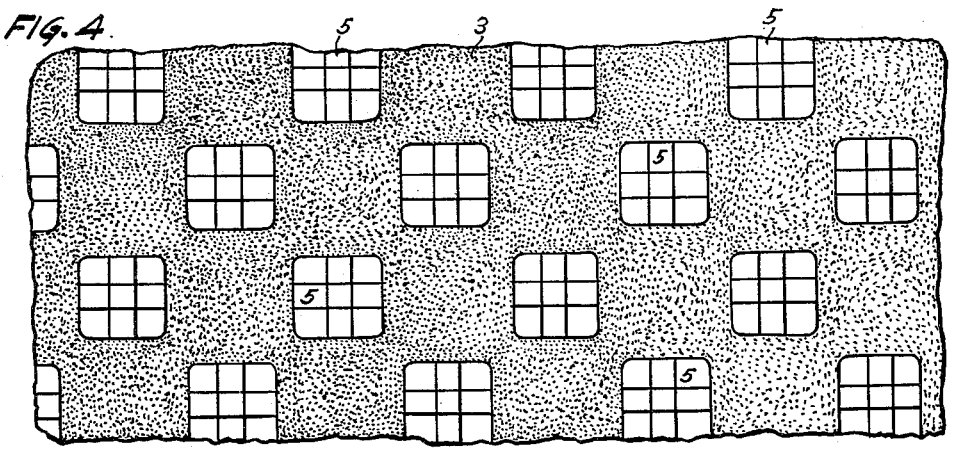
Figure 4 is a plan view of a coated fabric having a particular design formed thereon.

In Figure 4 the fabric base may be coated in the form of a spaced block design as illustrated at 5. The block designs 5 may be either devoid of any coating or coloring composition or may be filled with transparent coating or differently colored plastic composition so as to give the fabric a decorative effect. The decorative coating may comprise the application of one or more coatings upon the anchor base coating.

Figure 5:
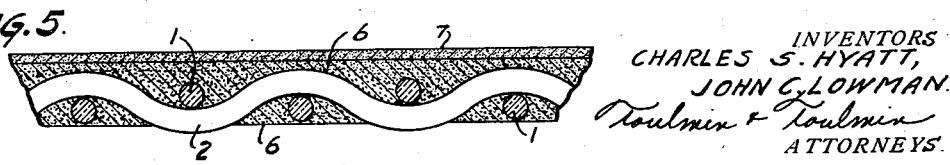
Figure 5 is a cross sectional view of a modified fabric coating material having a plurality of plastic coatings applied thereto.

In Figure 5 the coated fabric is provided with a plurality of coatings 6 and 7 on one side while the opposite side comprises only the initial plastic coating, as indicated at 6.

In accordance with this invention woven glass fabric of the desired weight and of loosely or closely woven structure is first coated with an adhesive coating composition in a suitable manner, such as by dipping, spraying, flow coating, knife coating, roller coating, and the like. The coated fabric material is then force air dried or heated at temperatures sufficient to drive off the volatile ingredients to produce a resultant tack-free, flexible, tough product. The baking time varies from one half hour to two and one half hours depending upon the particular coating composition used.

The following are typical examples of coating compositions employed for compounding the coated glass fabric of this invention:

*Example 1*

| | Parts |
|---|---|
| Phenol formaldehyde resin | 100 |
| China-wood oil | 312 |
| Bodied linseed oil | 160 |
| Mineral spirits | 200 |
| Titanium dioxide | 300 |

*Example 2*

| | Parts |
|---|---|
| Alkyd resin | 100 |
| Urea formaldehyde resin | 30 |
| Titanium dioxide | 60 |
| Zinc oxide | 20 |
| Xylol | 40 |
| Butanol | 10 |

*Example 3*

| | Parts |
|---|---|
| Nitrocellulose | 100 |
| Blown castor oil | 120 |
| Butyl acetyl ricinoleate | 30 |
| Butyl acetate | 45 |
| Butyl alcohol | 30 |
| Toluol | 75 |

*Example 4*

| | Parts |
|---|---|
| Ethyl cellulose | 100 |
| Tricresyl phosphate | 20 |
| Alkyd resin | 30 |
| Toluol | 60 |
| Ethanol | 35 |

In the above examples the phenol formaldehyde synthetic resin employed may be of the straight phenol formaldehyde type or of the modified phenolic variations, such as Amberol. These synthetic resins are of the oil soluble type. The phenol formaldehyde resin which may be employed in compounding the above coating composition may be produced as follows: 108 parts of cresol is mixed together with approximately 70 parts of formaldehyde (35 per cent formaldehyde solution) and the mixture heated to evaporate the water and the uncombined cresol. The reacted mixture is then incorporated with approximately 800 parts of melted colophony and the mass heated in an autoclave until a clear homogeneous resinous product is produced free from the odor of phenol. The volatile substances are then removed by heating and stirring, and 100 parts of glycerol at 28 degrees Baumé is added in small quantities while heating and stirring. The temperature of the mixture is maintained at approximately 275 degrees centigrade for several hours with frequent stirring until a viscous homogeneous resin is obtained.

In preparing the coating composition of Example 1, the synthetic resin and China-wood oil are combined by heating together with the bodied linseed oil. The latter is incorporated so as to avoid the gelling of the China-wood oil during the heat treatment. The mineral spirits is then added while stirring. This produces a varnish mixture. About two-thirds of the varnish thus produced should be used as the grinding medium for the pigment and the other one-third added after the grinding. The resultant coating composition exhibits a high degree of flexibility and toughness on application and baking. In preparing the coating composition, of course, other suitable phenol formaldehyde resins of the oil soluble type, which are well known in the art, may be substituted in place of the Amberol resin.

In preparing the coating composition of Example 2 disclosed in the above formula, the urea formaldehyde resin may be mixed with the alkyd resin and other ingredients forming the pigmented resinous coating composition. The alkyd resin may be prepared by heating 150 parts of phthalic anhydride with approximately 65 parts of glycerol and 150 parts of castor oil at approximately 200 degrees centigrade for about forty-five minutes. The resultant product is a yellowish, tough, flexible resin. The urea formaldehyde resins are made by condensing urea with formaldehyde, and are well known in the art.

In Example 3 the nitrocellulose ingredient is of the commercial variety. The particular viscosity of nitrocellulose selected for use may comprise a wide range of varieties depending upon the type of product desired. Nitrocellulose having around 30 seconds viscosity has shown exceptionally good durability and excellent film strength in compositions of this nature. It is dissolved in the solvent mixture comprising butyl acetate, alcohol and toluol, and the other ingredients incorporated therein. Butyl acetyl ricinoleate is added as a plasticizing agent.

The coating films formed from Example 3 exhibit a very high degree of flexibility and toughness and will retain this flexibility at low temperatures, for instance as low as −30 degrees centigrade. The plasticizer employed in Example 3 produces a coating having a very soft film.

The coating composition of Example 4 comprises ethyl cellulose modified by the addition of alkyd resin. The alkyd resin in this formula may be the same as employed in the coating composition of Example 2 disclosed above, but it is preferably of the vegetable oil modified alkyd type, which is more readily compatible with ethyl cellulose. The use of unmodified and low oil content alkyd resins is not recommended, however, since ethyl cellulose is not as readily compatible with these as the oil modified alkyds.

This type of alkyd resin is readily soluble in acetone and is easily incorporated with ethyl cellulose or nitrocellulose in any proportions to form a flexible coating composition. The ethyl cellulose employed may be of the commercial variety. The commercial product is obtainable with an ethoxy content of from 40 to 50 per cent. A grade which contains about 2.4 to 2.5 ethoxy groups per glucose residue is readily compatible with the solvents employed in compounding coating compositions of the nature described.

The initial coating composition applied should be thin enough to allow slight penetration between the openings of the threads of fibers so that after it has solidified it will form a strong mechanical bond holding the glass fibers securely together. The baking temperatures for the particular coating compositions vary, depending upon the particular type of composition. It should, however, generally be just below the point at which the pigment loses color or the binding material becomes yellow due to excess heat. The synthetic resinous compositions should ordinarily be dried at about 180 degrees to 300 degrees Fahrenheit. Nitrocellulose lacquer coatings are baked at a temperature of about 200 degrees Fahrenheit.

The coating composition should contain a minimum amount of volatile thinners, as the shrinkage of the film during evaporation, when considerable amounts of thinners are employed, tends to weaken the bond. Further it will generally be advantageous to heat the coating composition before applying. This will decrease the amount of thinner necessary to secure the proper fluidity of the coating and also speed up the drying time.

The use of alkyd resin in conjunction with ethyl cellulose in Example 4 greatly improves the durability of the coating. Further the alkyd resin protects the cellulose from the effects of ultraviolet rays which is important when durable transparent films are desired. The high degree of flexibility of this ethyl cellulose alkyd resin modified coating composition makes it ideal for coating fabric of this nature. The coating exhibits also an unusual resistance to alkalis and to discoloration by light which is highly desirable in preparing coated fabrics of this invention.

The various coating compositions may be directly applied to the glass fibers, which have been felted or woven in the form of a sheet or web. The adherence of the initial anchor coating applied to the glass fibers, however, may be improved if the surfaces of the glass fibers be previously roughened. This may be done by subjecting the fibers to the action of acids, such as hydrofluoric, nitric or equivalent acid for sufficient time to etch or erode the surface of the fibers. The etched uneven surfaces provide teeth around which the applied coating hardens whereby the coating is more securely anchored to the surface of the glass fibers.

The nitrocellulose coating, as well as the synthetic resin coating compositions above mentioned, adhere to the glass fibers readily and may be superimposed upon each other to form built up coatings of any desired color or design. Further when a high degree of flexibility of the coating is desired at all times the composition of Example 3 has been found to be most desirable. For producing different colored coatings of any suitable design, it will only be necessary to incorporate the desired pigment into the substantially colorless resinous cellulose compositions as illustrated above.

The new coated fabric of this invention has a variety of uses, such as for making linoleums, wall coverings, auto top material, window shades, upholstery, interior coverings, drapes and any other similar analogous uses wherein coated fabrics are employed.

It is understood, of course, that our improved coated fabric composition is not to be limited to the exact formulations and details of compounding the coated fabric product, since obvious modifications within the scope of this invention may be made by those skilled in the art.

Having thus fully described our invention what we claim as new and desire to secure by Letters Patent is:

As a new article of manufacture, a highly flexible woven glass fabric fibrous sheet coated and impregnated with a plastic composition composed of the heat reaction product of 100 parts oil soluble phenol formaldehyde resin, 312 parts Chinawood oil, and 160 parts bodied linseed oil, and 300 parts titanium dioxide.

CHARLES S. HYATT.
JOHN C. LOWMAN.